US012471536B2

(12) United States Patent
Führle et al.

(10) Patent No.: US 12,471,536 B2
(45) Date of Patent: Nov. 18, 2025

(54) DRIVE TRAIN ASSEMBLY FOR DRIVING A WORKING UNIT WITH A FLUCTUATING LOAD

(71) Applicant: Liebherr-Components Biberach GmbH, Biberach an der Riss (DE)

(72) Inventors: David Führle, Mietingen (DE); Viktor Schindler, Uttenweiler (DE); Stefan Binder, Neu-Ulm (DE); Norbert Hausladen, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 143 days.

(21) Appl. No.: 18/487,846

(22) Filed: Oct. 16, 2023

(65) Prior Publication Data
US 2024/0090382 A1    Mar. 21, 2024

Related U.S. Application Data

(63) Continuation of application No. PCT/EP2022/059845, filed on Apr. 13, 2022.

(30) Foreign Application Priority Data

Apr. 16, 2021  (DE) .......................... 102021109650.2
Jun. 22, 2021  (DE) .......................... 102021116061.8

(51) Int. Cl.
*B60K 6/12* (2006.01)
*A01B 71/06* (2006.01)
(Continued)

(52) U.S. Cl.
CPC .......... *A01F 15/0841* (2013.01); *A01B 71/06* (2013.01); *F16H 3/721* (2013.01); *F16H 3/725* (2013.01); *F16H 33/08* (2013.01)

(58) Field of Classification Search
CPC ..... A01F 15/0841; A01B 71/06; B60K 6/105; B60K 6/12; B60K 6/442; F16H 3/721; F16H 3/725; F16H 33/08
See application file for complete search history.

(56) References Cited

U.S. PATENT DOCUMENTS 5,894,718 A    4/1999  Hawlas et al.
6,105,353 A    8/2000  Mohr et al.
(Continued)

FOREIGN PATENT DOCUMENTS

CN    109936248 A  *  6/2019  ............ F16H 47/04
DE       3011833        8/1982
(Continued)

*Primary Examiner* — Tisha D Lewis
(74) *Attorney, Agent, or Firm* — Levine Bagade Han LLP (57) ABSTRACT

The present invention relates in general to working machines with working units which are subject to fluctuating loads or have a fluctuating power consumption. The invention relates in particular to a drive train assembly for driving such a working unit, the drive train assembly having a flywheel accumulator for mitigating the load impacts or load fluctuations. According to the invention, a starting aid for easier starting up of the flywheel accumulator into its desired operating speed range is provided, the starting aid having a planetary transmission, which is connected in terms of drive to the flywheel accumulator, and a control actuator for braking and/or accelerating a planetary transmission element in order to adjust the step-up/step-down ratio of the planetary transmission when starting up the flywheel accumulator. Furthermore, for refined smoothing of the power consumption in the started-up working mode, a control device is provided which accelerates and can brake the flywheel accumulator cyclically by adjusting the planetary transmission in accordance with the operating fluctuations of the working unit.

21 Claims, 4 Drawing Sheets (51) Int. Cl.
*A01F 15/08* (2006.01)
*F16H 3/72* (2006.01)
*F16H 33/08* (2006.01)

(56) References Cited

U.S. PATENT DOCUMENTS

| | | | |
|---|---|---|---|
| 2014/0165859 A1* | 6/2014 | O'Reilly | A01F 15/0841 100/179 |
| 2014/0248985 A1* | 9/2014 | Holmes | B60K 6/105 475/5 |
| 2021/0015049 A1 | 1/2021 | Naeyaert et al. | |

FOREIGN PATENT DOCUMENTS

| | | | | |
|---|---|---|---|---|
| DE | 3348157 C2 | | 4/1989 | |
| DE | 102014214614 A1 | * | 1/2016 | F02N 5/04 |
| EP | 3735819 | | 11/2020 | |
| EP | 3298872 | | 12/2020 | |
| NL | 9201893 A | * | 5/1994 | B60K 6/105 |
| WO | WO 2010/070158 | | 6/2010 | |
| WO | WO 2022/219030 | | 10/2022 | |

* cited by examiner

DRIVE TRAIN ASSEMBLY FOR DRIVING A WORKING UNIT WITH A FLUCTUATING LOAD

CROSS-REFERENCE TO RELATED APPLICATIONS

This application is a continuation of International Patent Application Number PCT/EP2022/059845 filed Apr. 13, 2022, which claims priority to German Patent Application Numbers DE 102021109650.2 filed Apr. 16, 2021 and DE 102021116061.8 filed Jun. 22, 2021, which are incorporated herein by reference in their entireties.

BACKGROUND

The present invention relates generally to working machines with working units that are subject to fluctuating loads or have fluctuating power consumption. In this context, the invention relates on the one hand to a drive train assembly for driving such a working unit with fluctuating power consumption from a drive source, having a flywheel accumulator for mitigating load impacts or fluctuations, and a starting aid for facilitating start up of a desired operating speed range of the flywheel accumulator. On the other hand, the invention relates to a working machine comprising a drive train assembly with fluctuating power consumption and said drive train assembly with a flywheel accumulator and starting aid.

In case of various working units, the fluctuations in load or power consumption are sometimes so strong that the drive source is subject to a significant change in speed, resulting in an overall jerky operation of the working machine, as the drive source itself cannot easily absorb or compensate for corresponding torque surges. For example, various agricultural working units exhibit such major load or power consumption fluctuations, which may be due to the mechanical design or operation of the working unit itself, or may also be caused by fluctuating external loads.

Such fluctuations in power consumption, which are known per se, can be seen for example in rectangular balers, where a tamper is periodically pushed into a bale chamber to press the crop into rectangular bales. Similar power consumption fluctuations caused by fluctuating external loads are also exhibited by chopper drums of forage harvesters or threshing equipment of a combine harvester, or also by the cutting mechanism of a round baler when the supplied crop slurry fluctuates more strongly.

If such working units are driven by a tractor via a power take-off shaft, speed fluctuations of the tractor's drive motor induced by the power consumption fluctuations of the working unit will not only lead to uneven operation of the working unit itself, but also to jerky driving of the tractor, since the tractor's drive motor serves not only as a power take-off drive, but also as a traction drive. With said rectangular baler, this can cause the pitching movement of the tractor with each ram stroke of the baler, which is not only uncomfortable for the operator, but can also lead to increased wear on components and affect engine life.

Various measures have already been considered to mitigate the effects of load or power consumption fluctuations of the working unit on the drive motor. For example, the patent document EP 3 298 872 B1 proposes a control system that detects or anticipates fluctuations in the power consumption of the working unit. The changes in speed of the drive motor are compensated to achieve an ultimately uniform driving speed of the tractor. This solution does not even attempt to prevent or mitigate the speed fluctuations of the drive engine due to the fluctuating power consumption of the working unit, but instead compensates for the effect of the speed fluctuations of the drive engine, so to speak, by intelligently controlling the diesel engine.

In yet another approach, a flywheel accumulator is provided in the drive train that drives the working unit, the kinetic energy of which mitigates the load or power consumption fluctuations of the working unit or their consequences. For example, such a flywheel accumulator in the drive train of a rectangular baler can smooth out the high energy required selectively or cyclically when the tamper is pushed into the bale chamber, in order to soften the impact on the tractor and avoid pitching movements or a jerky travel speed.

However, in order to achieve the best possible smoothing of the selective or cyclical energy fluctuations, it is necessary for the flywheel accumulator to be able to provide a sufficiently high kinetic energy. In this respect, it would be simple in itself to increase the flywheel mass of the flywheel accumulator, although this measure is subject to limitations for a number of reasons. On the one hand, the flywheel mass itself cannot be increased arbitrarily, since the available installation space is usually limited and attention must also be paid to the construction weight.

Insofar, on the other hand, due to the fact that the kinetic energy of the flywheel accumulator depends on its angular velocity, it has already been considered to increase the kinetic energy of the flywheel accumulator by increasing its rotational speed. More precisely, angular velocity squared enters kinetic energy according to the formula $E_{kin}=\frac{1}{2}*J_o*2$, where Jo is the moment of inertia and angular velocity.

On the other hand, such an increase in the flywheel accumulator's kinetic energy is also limited by the fact that the drive source, for example in the form of the tractor's drive engine, cannot provide the necessary torque to start up the flywheel accumulator. To counter this problem, a slip clutch is sometimes used upstream of the flywheel accumulator to gradually introduce the available drive power into the flywheel accumulator, thus extending the run-up time of the flywheel accumulator accordingly. This gradually brings the flywheel mass up to the desired set operating speed so that the drive motor is not stalled. However, such a slip clutch must be sufficiently dimensioned to be able to absorb the energy generated during the slip time, which is not readily possible in confined installation or ambient conditions.

It is therefore the object of the present invention to provide an improved drive train assembly of said type and an improved working machine having such a drive train assembly, which avoid disadvantages of the prior art and develop the latter in an advantageous manner. In particular, the flywheel accumulator should be able to provide sufficient energy for smoothing the power consumption fluctuations of the working unit in limited installation space without overloading the drive source or even stalling it when starting up.

SUMMARY

Said task is solved according to the invention with a drive train assembly as claimed in claim 1 and a working machine as claimed in claim 19. Preferred embodiments of the invention are the subject of the dependent claims.

It is therefore proposed to operate the flywheel accumulator via a planetary transmission with variable speeds or transmission ratios in order to be able to adapt the speed of the flywheel accumulator to the drive source and/or the power consumption of the working unit depending on the operating situation. Speed variability is especially beneficial for starting up the flywheel. During operation, depending on the design, the fixed transmission can be used. According to the invention, the starting aid for starting up the flywheel accumulator in its desired operating speed range in an easy manner comprises a planetary transmission which is connected in terms of drive to the flywheel accumulator and has at least one planetary transmission stage which is connected in terms of drive to the flywheel accumulator and whose planetary web is connected in a stationary manner to the stationary housing.

Advantageously, according to a further aspect, the starting aid comprises, in addition to the planetary transmission connected to the flywheel accumulator in terms of drive, an actuator and/or brake actuator for accelerating and/or decelerating a planetary transmission element in order to adjust the step-up/step-down ratio of the planetary transmission when starting up the flywheel accumulator.

By adjusting the speed of said planetary transmission element, its step-up/step-down ratio can be adjusted, on the one hand, when starting up the flywheel accumulator so that the drive source is not overloaded, while, on the other hand, the speed of the flywheel accumulator for working mode can be adjusted so that sufficient kinetic energy can be provided by the flywheel accumulator for smoothing the power consumption fluctuations of the working unit. In particular, the speed of the flywheel accumulator can be increased sufficiently for said smoothing to raise the kinetic energy to the required level. In the best case, the speed adjustment unit can then be decoupled from the running flywheel accumulator (coupling at the pump, brake at the motor). Thus, the efficiency of the drive assembly can be increased.

However, the planetary transmission connected to the flywheel accumulator and its adjustability with regard to the transmission ratio can not only be used as a starting aid, but also refine the buffer effect of the flywheel accumulator and adapt it better to fluctuations in the power consumption of the working unit. According to a further aspect of the present invention, a control device can control or actuate the drive and/or brake actuator for accelerating and/or decelerating the planetary transmission element and thus adjustment of the step-up/step-down ratio depending on power consumption fluctuations of the working unit in such a way that in phases of lower power consumption of the working unit the flywheel accumulator is accelerated and thus its kinetic energy is increased and in phases of higher power consumption of the working unit the flywheel accumulator can lose speed in such a way that over said phases of lower and higher power consumption an input speed and/or an input torque at an input shaft of the planetary transmission coming from the drive source remains at least approximately the same. Thus, the control device does not keep the step-up/step-down ratio of the planetary transmission constant, even in the working mode, in accordance with this aspect of the invention, but in particular cyclically varies it up and down to accelerate and decelerate the flywheel accumulator in accordance with the power consumption fluctuations of the working unit, thereby increasing and decreasing its kinetic energy to more finely compensate for the power consumption fluctuations of the working unit and to keep it as far away as possible from the drive source side of the planetary transmission so as not to affect the drive source. In particular, the flywheel accumulator can be accelerated and braked by adjusting the step-up/step-down ratio of the planetary transmission in such a way that the sum of the kinetic energy of the flywheel accumulator and the fluctuating energy input of the working unit remains approximately constant.

In particular, the control device can accelerate or brake the planetary transmission element in such a way that the sum of the torques at the input shaft of the planetary transmission connected to the drive source, at the planetary transmission element connected to the drive and/or brake actuator and at the transmission output shaft connected to the working unit remains at least approximately in equilibrium, in particular approaches zero.

Said control device can in particular be configured to adjust the planetary transmission element, which influences or controls the speed of the flywheel accumulator, likewise cyclically in accordance with the fluctuation cycle of the power consumption when the power consumption of the working unit fluctuates cyclically, and to accelerate and decelerate the flywheel accumulator cyclically accordingly. For example, if the working unit is a rectangular baler, the power consumption of the working unit follows the movement of the tamper into the press chamber and thus the cycle of the crankshaft movement to which the tamper is connected. Since the high pressing force and thus also the energy required for this is only required very selectively, for example over only about 10 angular degrees, when the tamper crankshaft is rotated over the remaining 350 angular degrees, the flywheel mass can be accelerated and driven faster by adjusting the planetary transmission element by the drive and/or brake actuator accelerating the planetary transmission element accordingly, so that the flywheel accumulator overspeeds, as it were, with regard to its speed and receives excess kinetic energy, which can then be released again for the brief moment of pressing. In the further course, energy can then be collected again over the next 350 angular degrees or the next phase of lower power consumption by accelerating the flywheel accumulator. Such cyclical adjustment of the planetary transmission and accompanying cyclical acceleration and deceleration of the flywheel accumulator can provide additional load relief and improved uniformity of the drive shaft.

The control device can carry out the back and forth movement of the planetary transmission in working mode, in particular around a working point or in a certain speed range of the flywheel accumulator depending on various operating parameters, or determine the power consumption fluctuations in various ways. For example, the control device can cooperate with a detection device that can directly detect the power consumption of the working unit and/or a torque and/or an actuating force on the working unit or on a planetary gear output shaft, for example, by means of a force sensor and/or a strain gauge or other suitable sensor system that can be used to measure relevant operating variables. In a baling press, for example, there can be detected pressure in the baling chamber and/or a position of a baling element.

In the case of power consumption fluctuations that occur cyclically and/or depend on or are influenced by the operating mode of the working unit, other representative variables can also be determined on the basis of which the control device can adjust the planetary transmission. For example, a position sensor can be used to detect the position of the working unit, for example the position of the tamper in the press chamber, or a rotary encoder can be used to detect the rotational position of the tamper crankshaft in order to adjust the planetary transmission depending on the tamper position and/or the crankshaft rotation angle.

Alternatively or additionally, however, in the case of a cyclically fluctuating power consumption, there can simply be provided a time control. For example, a fluctuation period can be detected or determined, for example in the form of a grindingly determined average value, in order to then provide a certain adjustment of the planetary transmission in certain sections of the respective period or to control this depending on time.

The drive and/or brake actuator for adjusting the planetary transmission can basically be configured in different ways, wherein advantageously the drive and/or brake actuator can be integrated into the planetary transmission and/or connected to the planetary transmission element itself.

In particular, said drive and/or brake actuator may comprise a hydraulic or electric drive and/or brake motor that may accelerate and/or decelerate said planetary transmission element, which may affect the rotation speed of the flywheel accumulator or the transmission ratio between the planetary transmission input shaft and the flywheel accumulator, in a desired manner in order to gradually start up the flywheel accumulator in said manner as part of the starting aid and/or to selectively accelerate the flywheel accumulator during the operational power consumption fluctuations of the working unit in its working mode in order to have increased kinetic energy for required power peaks.

For certain applications, however, it could also be sufficient to provide only one brake as the drive and/or brake actuator, for example in the form of a shoe or disc brake, which can brake the planetary transmission element for a desired adjustment of the step-up/step-down ratio. This would be sufficient, for example, for a pure starting aid in which the planetary transmission element, which can be influenced by the drive and/or brake actuator, is first allowed to spin freely, so to speak, when the drive source is running, and is then braked up gradually to bring the flywheel accumulator up to its operating speed range.

Advantageously, however, the drive and/or brake actuator can comprise, possibly also in addition to such a brake, a drive and/or brake motor which can be controlled in its rotational speed in order to be able to accelerate the rotational speed of said planetary transmission element, if necessary, but by means of such a drive and/or brake motor it is also possible to bring about braking of the planetary transmission element when the motor is operated in braking mode.

Such a drive and/or brake motor can be supplied with drive energy in various ways, for example from a pump or generator that can be driven directly from the drive source, or from a pressurized or battery storage system.

In an advantageous further embodiment of the invention, said drive motor and/or brake motor may also be supplied with pressurized fluid or power by a pump or generator which may be tied to the planetary transmission itself, in particular geared to a planetary transmission input shaft, such that the planetary transmission input shaft drives said pump or generator. In particular, the pump or generator may be integrated into the planetary transmission or mounted in or on the housing of the planetary transmission.

The pump or generator can be connected to the planetary transmission input shaft via a suitable gear stage, for example a spur gear.

However, as an alternative to being connected to the planetary transmission input shaft or planetary transmission input element, said pump or generator may also be connected on the output side of the planetary transmission, such as a shaft portion leading from the planetary transmission to the working unit.

In an advantageous further embodiment of the invention, the planetary transmission may include a drive-through transmission that bypasses the planetary transmission stage to control the speed of the flywheel accumulator from the planetary transmission input side to the output shaft that leads from the planetary transmission to the working unit. The flywheel accumulator is branched with respect to said drive-through transmission via said planetary transmission stage and, accordingly, its speed can be varied with respect to the drive speed of the drive train part leading to the working unit.

Said drive-through transmission, which passes the planetary transmission stage for connecting the flywheel accumulator, can pass through the planetary transmission in the form of a through shaft and thus without transmission ratio, so that the planetary transmission input shaft has the same speed as the output shaft leading to the working unit. Alternatively, however, said drive-through transmission may very well have a step-up/step-down stage, for example in the form of a second planetary transmission stage or a spur gear stage. Advantageously, the speed of the flywheel accumulator can also be varied in this case via said planetary transmission stage relative to the speed of the drive-through transmission, whether on the input side or on the output side.

In a further development of the invention, the planetary transmission can be configured as a single stage or comprise only one planetary transmission stage, which is driven by the transmission input shaft and can drive the flywheel accumulator on the output side.

Said flywheel accumulator can advantageously be integrated into the planetary transmission, in particular arranged within a common transmission and flywheel housing.

In principle, the assignment of the transmission elements of said planetary transmission stage to the relevant components such as flywheel accumulator, drive and/or brake actuator and/or input and/or output shaft can be different.

According to an advantageous embodiment of the invention, the transmission input shaft may be connected to a ring gear of the planetary transmission stage connecting the flywheel accumulator so that said ring gear rotates at the input speed. In this case, the aforementioned pump or generator may be connected to said ring gear, for example via a suitable intermediate gear stage.

The flywheel accumulator can advantageously be connected to the sun gear of the planetary transmission stage so that the step-up/step-down ratio to the flywheel accumulator can be controlled by braking and/or accelerating the web or planetary carrier. In particular, said planetary carrier can be acted upon in a braking manner to gradually start up the flywheel accumulator. Alternatively, or additionally, the planetary carrier can be accelerated and/or braked in the working mode of the flywheel accumulator, which is in itself starting up, in order to more finely balance cyclically or other fluctuations in the power consumption of the working unit in the manner described. Said transmission input shaft, which may be connected to or form the transmission input side and may be connected to or form the output side, may be rotationally fixed to the ring gear of the planetary stage and extend through the sun gear, wherein the ring gear and the transmission input shaft may be rotatably supported on each other and/or may also be separately supported on the transmission housing.

For braking and/or accelerating and/or holding the planetary transmission element controlling the transmission ratio, in particular said planetary carrier, said drive and/or brake actuator, in particular said electric or hydraulic drive motor, can be connected to said planetary transmission element via a gear stage, for example in the form of a spear gear stage. For example, the planetary carrier may include a drive gear that may extend between the flywheel accumulator and the planetary stage and independently mesh with a pinion or drive gear to which said drive and/or brake actuator may be attached.

In order to achieve a compact, space-saving design, the drive and/or brake actuator and the flywheel accumulator can be arranged towards different end faces of the planetary transmission and/or be arranged on different sides of the planetary transmission stage, via which the flywheel accumulator is then connected to the drive train. For example, the drive and/or brake actuator may be provided at a lateral end portion of the planetary transmission forming its input side, while the flywheel accumulator may be provided at an end portion of the planetary transmission forming its output side.

BRIEF DESCRIPTION OF THE DRAWINGS

The invention will be explained in more detail in the following with respect to preferred embodiments and to associated drawings. The drawings show.

DETAILED DESCRIPTION

Figure 1:
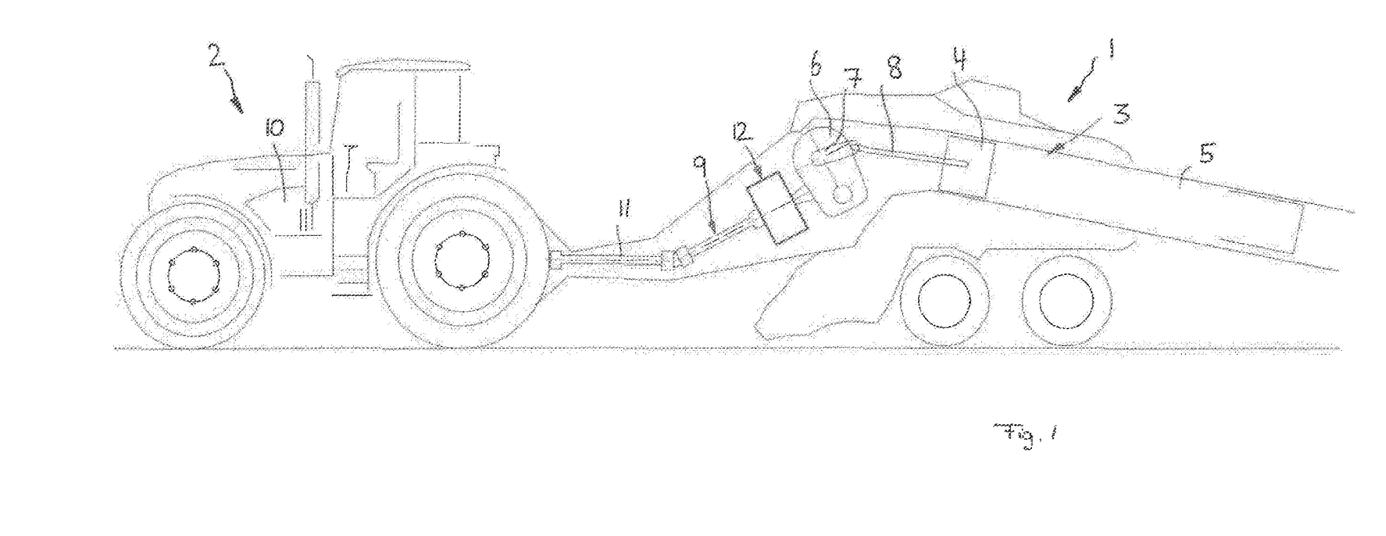
FIG. 1: a working machine with a drive train comprising a flywheel accumulator connected via a planetary transmission, according to an advantageous embodiment of the invention, wherein the working machine is configured in the form of a baler and the drive train is connected via a power take-off shaft to a tractor forming the drive shaft.

As FIG. 1 shows, the working machine 1 can be configured as an agricultural machine for processing harvested crops or, if necessary, also for soil cultivation, in particular in the form of an attachment device for mounting on a tractor 2.

The working machine 1 comprises at least one working unit 3, which can be subjected to cyclically strongly fluctuating loads in working mode and/or can exhibit a cyclically strongly fluctuating power consumption. As shown in FIG. 1, the working machine 1 can in particular be configured as a rectangular baler whose working unit 3 can comprise a tamper 4 that enters a bale forming chamber 5 or is cyclically moved back and forth therein in order to compress harvested material picked up from the ground and conveyed into the bale forming chamber 5 via a suitable conveying direction into bales.

A drive device 6 for driving the working unit 3 may include a tamper crankshaft 7 capable of reciprocally driving said tamper 4 via a connecting rod 8.

Said drive device 6 may comprise a mechanical drive source 9 which may be rotationally driven by a drive source 10, said drive source 10 being in particular the drive engine of the tractor 2 which may, on the one hand, form the traction drive of the tractor 2 and, on the other hand, drive the drive source 9 of the working machine 1 via the power take-off shaft of the tractor 2 and a cardan shaft 1 connected thereto.

Figure 2:
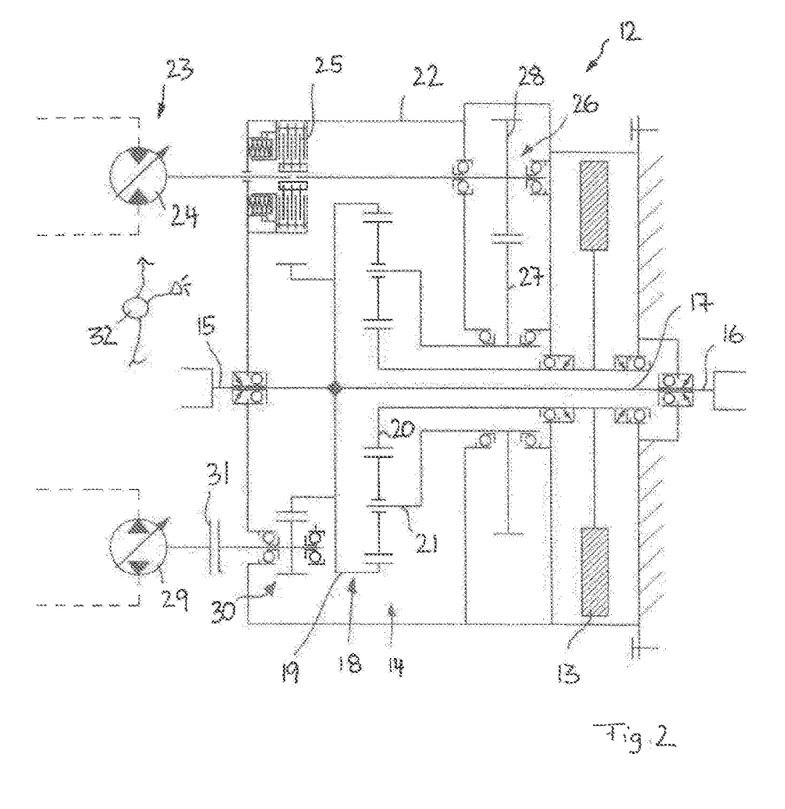
FIG. 2: a sectional view of the drive train of the working machine of FIG. 1 in the region of the flywheel accumulator and the planetary transmission, wherein, according to an advantageous embodiment of the invention, a drive motor is provided for braking and accelerating a planetary transmission element for changing the step-up/step-down ratio toward the flywheel accumulator, and a pump or generator is connected to an input element of the planetary stage for supplying power to the drive motor.
Figure 3:
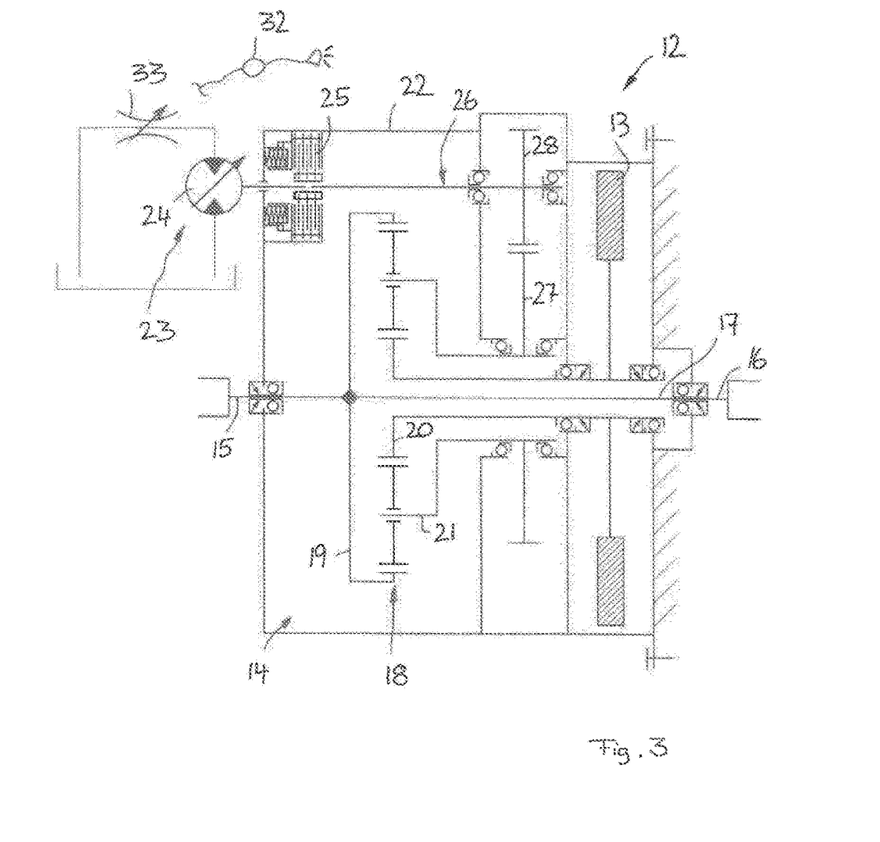
FIG. 3: a sectional view of the drive train assembly comprising the flywheel accumulator and the planetary transmission according to a further embodiment of the invention, wherein the drive and/or brake actuator comprises a drive motor operating as a brake motor and an energy supplier pump or generator is omitted.
Figure 4:
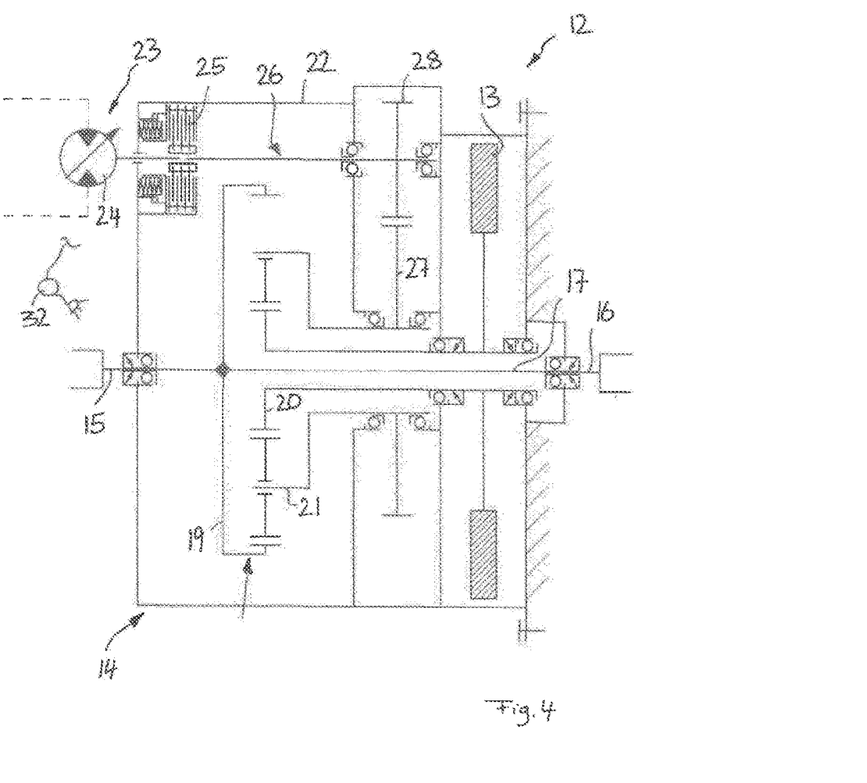
FIG. 4: a sectional view of the drive train assembly comprising the flywheel accumulator and the planetary transmission according to a further embodiment of the invention, wherein the drive and/or brake actuator comprises a drive motor which can be supplied with energy from an external energy supply or from the drive shaft.

In order to mitigate the power consumption fluctuations of the drive device 6 occurring during baling or to keep them away from the drive source 10, said drive train 9 of the working machine 1 comprises a drive train assembly 12, cf. FIG. 1, comprising a flywheel accumulator 13 and a planetary transmission 14 through which the flywheel accumulator 13 is connected to the drive train 9, as shown in FIGS. 2 to 4.

In the working mode of the working machine 1, the flywheel accumulator 13 stores kinetic energy which flows into the working unit 3 when the bale is pressed or a power peak occurs and gives the latter momentum in addition to the drive power of the drive source 10, as it were, and conversely can be charged from the drive source 10 in operating phases of lower power demand.

As shown in FIGS. 2 to 4, the planetary transmission 14 includes a transmission input shaft 15 that is connected to or receives torque from the drive source 10 and is driven, for example, by said cardan shaft 11. The transmission input shaft 15 passes through the planetary transmission 14 to a transmission output shaft 16, which drives the drive device 6 of the working unit 3. The transmission bushing 17 may be configured to be free of step-up/step-down reduction and may be formed, for example, by a drive shaft that connects the transmission input to the transmission output. The transmission input shaft 15 can rotate at the same speed as the transmission output shaft 16.

The planetary transmission 14 may be designed with one or more stages, with the at least one planetary transmission stage 18 connecting the flywheel accumulator 13 to the drive train 9, in particular to said transmission bushing 17 and/or to the transmission output shaft 16.

As shown in the figures, the planetary transmission stage 18 may be connected to the transmission input shaft 16 by a ring gear 19 so that the ring gear 19 rotates at the input speed.

The flywheel accumulator 13 may be connected to or rotationally fixed to the sun gear 20.

The planetary carrier 21 can be used to adjust the step-up/step-down ratio of the planetary transmission 14, said planetary carrier 21 being rotatably mounted, for example, on the sun gear 20 and/or on a planetary transmission housing 22.

In order to be able to brake and/or accelerate the planetary carrier 21, a drive and/or brake actuator 23 is provided, which may comprise a drive motor 24 and/or a mechanical brake 25.

Said drive motor 24 may be a hydraulic motor or an electric motor and, depending on the configuration, may be used as a brake motor or may be used in an actively driving manner, i.e. accelerating the planetary carrier 21.

Said brake 25 can be configured differently depending on its use, for example as a parking brake that can hold the planetary carrier 21 against the planetary transmission housing 22, or as a friction brake that can reduce the speed of the planetary carrier 21. For example, the brake 25 may be a disc or multi-disc brake that may be biased to a braking position and released by pressure means.

As shown in the figures, the flywheel accumulator 13 and the at least one planetary transmission stage 18 may be accommodated in a common planetary transmission housing 22. To be compact, it may be advantageous to have the planetary transmission stage 18 more toward the input side of the planetary transmission 14 and the flywheel accumulator more toward the output side of the planetary transmission 14.

Advantageously, the gear train 26 for braking and/or accelerating the planetary carrier 21 can be arranged in an area between the planetary transmission stage 18 and the flywheel accumulator 13. Regardless thereof, said gear train 26 connecting the drive and/or brake actuator 23 to the planetary carrier 21 may include a drive gear 27 rotationally connected to the planetary carrier 28, which may be disposed between the flywheel accumulator 13 and the sun gear 20. Regardless thereof, the drive gear 27 may be in rolling engagement with another gear wheel 28 which is rotationally connected to a drive and/or brake shaft 29 which may extend axially beyond the planetary transmission stage 18 radially outwardly thereof. The drive and/or brake actuator and the planetary carrier drive gear 27 can be arranged on different sides of the planetary transmission stage 18, cf. FIGS. 2-4, in order to achieve a compact design on the one hand and also to have an easy-to-maintain mounting position for the drive and/or brake actuator 23 on the other.

As shown in the figures, the drive and/or brake actuator 23 may be arranged on an end face of the planetary transmission housing 22, in particular on its input side.

Regardless of the architecture of the planetary transmission 14, the drive and/or brake actuator 23 can brake and/or accelerate a planetary transmission element of the at least one planetary transmission stage 18, in particular its planetary carrier 21, in order to adjust the step-up/step-down ratio of the planetary transmission 14 and thus the speed of the flywheel accumulator 13 relative to the speed of the transmission input and/or output shafts 15, 16.

As FIG. 2 shows, the drive and/or brake actuator 23, in particular said drive motor 24, can be supplied with energy by an energy generator 29, which can be a pump if the drive and/or brake actuator 23 is configured hydraulically and a generator if it is configured electrically, said energy generator 29 being integrated into or mounted on the drive train assembly, in particular the planetary transmission 14. As FIG. 2 shows, the energy generator 29 can be connected to the transmission input shaft 15, in particular the ring gear 19 of the planetary gear stage 18, via a gear stage 30, for example a spear gear stage, so that the drive train 9 drives the energy generator 29. Advantageously, said energy generator 29 can be arranged together with the drive and/or brake actuator 23 on the same transmission side, in particular the end face of the planetary transmission housing 21, in order to achieve a compact design.

In order not to have an unnecessary running along and thus efficiency losses in the stationary state, a coupling 31 can be provided for uncoupling the energy generator 29 from the drive train 9.

By means of the drive and/or brake actuator 23 and the braking and/or acceleration of the adjustable planetary transmission element, in particular of said planetary carrier 21, which can be achieved by this means, a starting aid can be realized in order to gradually start up the flywheel accumulator 13 even with limited drive power of the drive source 10 without stalling the drive source 10. Alternatively or additionally, by braking and/or accelerating said planetary transmission element and thus braking and/or accelerating the flywheel accumulator 13, a finer mitigation of the power consumption fluctuations of the working unit 3 in its working mode can be achieved, as will be explained below.

When the working machine 1 is started up, energy is drawn from the drive train 9 by the energy generator 29 connected thereto, and said energy generator 29 can be driven by the ring gear 19 of the planetary transmission stage 18 via the gear stage 30, as shown in FIG. 2. The energy generator 29 feeds the motor 24 of the drive and/or brake actuator 23, and in such a way that the motor 24 operates as a brake motor, i.e., operates in braking mode and if hydraulically configured, operates in pump mode.

This brakes the planetary carrier 21 during start up. The slower standing speed gradually increases the speed of the sun gear 20 and thus the speed of the flywheel accumulator 13.

A target operating speed of the flywheel mass can be achieved, for example, by braking the planetary carrier 28 down to speed 0, i.e. by holding it in place at the planetary transmission housing 22. In this operating condition, the transmission ratio of the planetary transmission 14 is obtained by translating the ring gear speed, and thus the input speed, through the planet gears to the sun gear 20.

Thus, by the interaction of the energy generator 29 with the drive and/or brake actuator 23 there can be achieved a gradual start up of the flywheel accumulator 13 without the need for a slip clutch.

Once the planetary carrier 21 is braked down to speed 0, the mechanical brake 25 can be applied or locked to hold the planetary carrier 21 to the housing 22. This eliminates the need to keep motor 24 active after the start-up or run-up process, and eliminates the need for power from energy generator 29.

In particular, after the run-up process, the energy generator 29 can be disconnected from the drive train 9 via the coupling 31 so that it does not run unnecessarily and does not have any idling losses.

Said brake 25 may serve as overload protection for flywheel accumulator 13 when the drive train assembly is in start-up working mode. In the event of a blockage in the drive train 9 or also in the event of an overload of the working unit 3, the torque generated by the flywheel mass can flow off by slipping of the brake 25, wherein the threshold for actuating the overload protection can be set by adjusting the brake force. In particular, the brake 25 can be set so that when a determined limit torque occurs, the brake 25 slips.

Alternatively, or in addition to the starting aid described, the connection of the flywheel accumulator 13 to the drive train 9 via the planetary transmission 14 can also be used to achieve even finer compensation of torque or power consumption fluctuations of the working unit 3.

In particular, the motor 24 can accelerate and/or brake the planetary transmission element, in particular the planetary carrier 21, in operating phases of lower power consumption in such a way that the flywheel accumulator 13 receives an increased speed, possibly also being overspeeded beyond its intended desired operating speed, as it were. For example, the planetary carrier 21 can be driven in a negative direction to further shift the step-up/step-down ratio such that the flywheel accumulator 13 is accelerated. The flywheel accumulator 13 can then feed the kinetic energy present at this increased speed back into the drive train 9 during an operating phase of higher power consumption of the working unit 3 in order to meet the torque requirement or to keep the torque surge away from the drive source 10.

In case of a working machine 1 with cyclical torque surges or cyclical power consumption fluctuations, as they occur in a rectangular baler, the planetary transmission stage 18 can be cyclically adjusted back and forth with regard to its step-down/step-up ratio in order to achieve a further refined smoothing of the power requirement of the working unit 3. For example, when compressing a bale of crop by retracting the tamper 4, its high pressing force and thus also the energy required for this is only required very selectively over, for example, 10 angular degrees of the tamper crankshaft 7, so that over the remaining 350 angular degrees the flywheel accumulator 13 can be accelerated by the drive motor 24, in particular by driving the planetary carrier 21 in the negative direction and over-rotating the flywheel accumulator 13, as it were. The energy collected in this way can be released again for the brief moment of baling, wherein energy can then be collected again via the renewed 350 angular degrees of the tamper crankshaft 7 by higher rotation of the flywheel mass. Through this, an additional relief and uniformity of the operation of the drive source 10 and thus of the tractor operation can be achieved.

In order to achieve the described start up of the flywheel mass in operating phases of lower power consumption and the energy output and thus braking of the flywheel accumulator in operating phases of increased power consumption, the energy generators 29 and the motor 24 and the flywheel mass of the flywheel accumulator 13 can be matched to each other in such a way that the torque sum from the three interacting transmission elements is kept in balance, in particular 0.

Depending on the design of the system, an electronic control device 32 can also be provided which, for example by adjusting the motor 24, carries out the desired start up of the flywheel mass in operating phases of lower power requirement, wherein the control device 32 can detect or determine the power fluctuations in the manner already described at the beginning by means of a detection device and can control the motor 24 depending on the signal or parameter characterizing the power fluctuations.

As shown in FIG. 3, the energy generator 29 may be omitted, wherein the motor 24 of the drive and/or brake actuator 23 may operate only as a brake motor, wherein the braking force of the motor 24 may be controlled by an adjustable throttle 33.

As shown in FIG. 4, the motor 24 can also be powered externally, for example from the tractor 2. By controlling the motor 24 by means of the control device 32, both the starting aid and the refined smoothing of the energy demand in the working mode can also be achieved in this case.

For switching off the drive or the working unit and the associated reduction of the kinetic energy of the flywheel accumulator 13, there can be advantageously used a freewheel provided in the power take-off or drive train, by which the stored energies in the flywheel mass can be reduced. The deceleration process takes a little time, but due to the mechanical friction losses in the drive train, the energy of the flywheel mass can be dissipated independently. In the event that the shutdown procedure takes too long, the previously described procedure of starting up is reversed, i.e. the motor 24 can drive the planetary web 21 again so that the flywheel mass 13 slows down. The energy released is dissipated.

Thus, independent from one another, the above-described subject-matter includes the following advantageous aspects:

A flywheel mass accumulator with a planetary transmission in a baler drive train.

The coupling of the ring gear with the continuous drive train, for example the power take-off shaft of the drive machine.

The attachment of the flywheel mass to the sun gear.

The planetary web can initially rotate freely, thus the flywheel mass at the sun gear is not accelerated (the motor runs along empty).

The run-up of the flywheel mass via the speed reduction of the web of the planetary transmission.

Driving a pump or generator via a spur gear and transfer the energy to a motor, which reduces the web speed.

Reducing the web speed increases the speed of the sun gear and thus the speed of the flywheel mass.

After completion of the run-up phase, the hydraulic or electric motor string can be firmly braked by a holding brake, so that the motor is unloaded and does not need to run during operation, and idling losses can be reduced.

The brake can be omitted, in particular if the motor shaft, or the motor can be held in rotation.

The pump or generator can be disconnected from the drive train so that it does not run during operation.

The brake can act as overload protection in the event of blockages in the drive train and can be set to a threshold value for slipping. (Brake equals slipping clutch).

Optionally, the brake can also be set to different visual threshold values during operation by changing the air pressure.

The motor provided to reduce the speed of the planetary web can also be powered directly from the drive source driving the working unit, and the pump or generator in the drive train assembly can be omitted (external power supply).

The hydraulic or electric motor works as a retarder.

If a sufficiently dimensioned slip clutch is used to absorb the run-up energies, the pump and motor can be omitted.

By briefly accelerating the flywheel mass within the torque-reduced operating phase of the unit or the torque-reduced circumferential path, (until the required energy is released within approx. 10°), there can additionally take place a better energy smoothing for the drive train.

We claim:

1. A drive train assembly for driving a working unit with fluctuating power consumption from a drive source comprising:

a flywheel accumulator for mitigating load impacts and/or power consumption fluctuations, a starting aid comprising a planetary transmission having at least one planetary transmission stage drive-connected to the flywheel accumulator, wherein the starting aid is configured to start up the flywheel accumulator into a desired speed range, wherein the starting aid further comprises a drive and/or brake actuator for braking and/or accelerating a planetary transmission element in order to adjust a step-up/step-down ratio of the at least one planetary transmission stage when starting up the flywheel accumulator into its desired operating speed range;

an energy supplier for supplying energy to the drive and/or brake actuator, wherein the energy supplier is integrated into the planetary transmission and is connected to a transmission input and/or output shaft for driving an energy generator so that the drive and/or brake actuator is increasingly supplied with energy as the drive speed increases when starting up the drive assembly; and a planetary web stationarily connected to a stationary housing.

2. The drive train assembly of claim 1, wherein the flywheel accumulator is configured to mitigate load impacts and/or power consumption fluctuations of the working unit, the assembly further comprising a control device for controlling the flywheel accumulator, wherein the control device comprises the planetary transmission, and wherein the planetary transmission has at least one planetary transmission stage, which is connected in terms of drive to the flywheel accumulator, and wherein the assembly further comprises a drive and/or brake actuator for braking and/or accelerating a planetary transmission element in order to adjust the step-up/step-down ratio of the planetary transmission stage, wherein the control device is configured to actuate the drive and/or brake actuator depending on the load impacts and/or power consumption fluctuations of the working unit in such a way that in the operating phases of lower power consumption of the working unit, the flywheel accumulator is accelerated by adjusting the step-up/step-down ratio of the planetary transmission stage and in operating phases of higher power consumption of the working unit, the flywheel accumulator is braked by adjusting the step-up/step-down ratio of the planetary transmission stage, and an input speed and/or an input torque at an input shaft of the planetary transmission driven from the drive source is kept at least approximately constant throughout said operating phases of lower and higher power consumption.

3. The drive train assembly of claim 1, wherein the drive and/or brake actuator comprises a hydraulic or electrical motor for braking and/or accelerating the planetary transmission element.

4. The drive train assembly of claim 1, wherein the energy generator is drive-connected to a planetary transmission element comprising a ring gear of the planetary transmission stage, which rotates at an input speed of the planetary transmission stage.

5. The drive train assembly of claim 4, wherein the energy generator is drive-connected to the planetary transmission element through a gear stage.

6. The drive train assembly of claim 5, wherein the energy generator is engageable and disengageable by a clutch, wherein the clutch is configured and controlled to disengage upon or after the flywheel accumulator reaches the desired operating speed range.

7. The drive train assembly of claim 1, wherein the drive and/or brake actuator is configured to be supplied with energy from the energy generator when starting up the drive train assembly in such a manner that the drive and/or brake actuator brakes the planetary transmission element and thereby adjusts the step-up/step-down ratio of the planetary transmission stage and thereby increases the speed of the flywheel accumulator.

8. The drive train assembly of claim 3, wherein when starting up the flywheel accumulator, the motor of the drive and/or brake actuator is configured to operate as a brake motor and/or is configured as a pure brake motor.

9. The drive train assembly of claim 8, further comprising a controllable throttle associated with the brake motor for setting a braking torque.

10. The drive train assembly of claim 8, further comprising a brake, and wherein the brake and/or the brake actuator are configured to lock the planetary transmission element for adjusting the step-up/step-down ratio of the planetary transmission stage in stationary working mode to hold the planetary transmission stage in place at a planetary transmission housing.

11. The drive train assembly according to claim 10, wherein the brake and/or brake actuator are configured to provide overload protection in a working mode and to slip when a predetermined limit torque is reached.

12. The drive train assembly of claim 1, wherein the starting aid is configured to operate without slipping clutches and/or to operate without slipping clutches when starting up.

13. The drive train assembly of claim 1, wherein the flywheel accumulator, the planetary transmission and the drive and/or brake actuator form a pre-assembled mounting assembly having input and output shaft connections for connection to a drive train for driving the working unit, and wherein the pre-assembled mounting assembly is assembled into the drive train.

14. The drive train assembly of claim 1, wherein the planetary transmission stage and the flywheel accumulator are in a planetary transmission housing, and wherein the planetary transmission housing is closer to a transmission input side of the planetary transmission housing than the flywheel accumulator, and wherein the flywheel accumulator is closer to a transmission output side of the planetary transmission housing than the planetary transmission stage.

15. The drive train assembly of claim 14, wherein the drive and/or brake actuator and an energy generator are mounted on a transmission input side of a planetary transmission housing.

16. The drive train assembly of claim 1, wherein the drive and/or brake actuator is/are connected to the planetary transmission element in order to adjust the step-up/step-down ratio by a gear train which extends axially across the planetary transmission stage and/or extends at least partially between the planetary transmission stage and the flywheel accumulator.

17. A working machine having a drive train assembly of claim 1.

18. The working machine of claim 17, comprising an agricultural harvesting or soil working machine, comprising a rectangular baler.

19. The working machine of claim 17, wherein the working machine comprises an attachment device for mounting on a towing vehicle, and wherein the drive source is located on the towing vehicle, and wherein the drive train assembly is configured to be coupled to the drive source via a mechanical drive train.

20. A drive train assembly for driving a working unit with fluctuating power consumption from a drive source comprising:

a flywheel accumulator for mitigating load impacts and/or power consumption fluctuations, a starting aid comprising a planetary transmission having at least one planetary transmission stage drive-connected to the flywheel accumulator, wherein the starting aid is configured to start up the flywheel accumulator into a desired speed range, and wherein the starting aid further comprises a drive and/or brake actuator for braking and/or accelerating a planetary transmission element in order to adjust a step-up/step-down ratio of the at least one planetary transmission stage when starting up the flywheel accumulator into its desired operating speed range, wherein the drive and/or brake actuator comprises a hydraulic or electrical motor for braking and/or accelerating the planetary transmission element, wherein when starting up the flywheel accumulator, the motor of the drive and/or brake actuator is configured to operate as a brake motor and/or is configured as a pure brake motor; and a planetary web stationarily connected to a stationary housing.

21. A drive train assembly for driving a working unit with fluctuating power consumption from a drive source comprising:

a flywheel accumulator for mitigating load impacts and/or power consumption fluctuations, a starting aid comprising a planetary transmission having at least one planetary transmission stage drive-connected to the flywheel accumulator, wherein the starting aid is configured to start up the flywheel accumulator into a desired speed range, and wherein the starting aid further comprises a drive and/or brake actuator for braking and/or accelerating a planetary transmission element in order to adjust a step-up/step-down ratio of the at least one planetary transmission stage when starting up the flywheel accumulator into its desired operating speed range, wherein the drive and/or brake actuator is/are connected to the planetary transmission element in order to adjust the step-up/step-down ratio by a gear train which extends axially across the planetary transmission stage and/or extends at least partially between the planetary transmission stage and the flywheel accumulator; and a planetary web stationarily connected to a stationary housing.

* * * * *